US012008949B2

(12) United States Patent
Su

(10) Patent No.: US 12,008,949 B2
(45) Date of Patent: Jun. 11, 2024

(54) DRIVER FOR DISPLAY PANEL

(71) Applicant: SITRONIX TECHNOLOGY CORP., Hsinchu County (TW)

(72) Inventor: Chung-Hsin Su, Hsinchu County (TW)

(73) Assignee: SITRONIX TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 18/091,693

(22) Filed: Dec. 30, 2022

(65) Prior Publication Data

US 2023/0401995 A1 Dec. 14, 2023

Related U.S. Application Data

(60) Provisional application No. 63/266,199, filed on Dec. 30, 2021.

(51) Int. Cl.
*G09G 3/32* (2016.01)
*G09G 3/20* (2006.01)

(52) U.S. Cl.
CPC ............. *G09G 3/32* (2013.01); *G09G 3/2092* (2013.01); *G09G 2300/0408* (2013.01); *G09G 2300/0426* (2013.01); *G09G 2300/0452* (2013.01); *G09G 2310/0267* (2013.01); *G09G 2310/06* (2013.01); *G09G 2320/0204* (2013.01); *G09G 2320/0233* (2013.01); *G09G 2330/06* (2013.01)

(58) Field of Classification Search
CPC ................... G09G 3/32; G09G 3/2092; G09G 2300/0452; G09G 2320/0204; G09G 2320/0233
See application file for complete search history.

(56) References Cited

U.S. PATENT DOCUMENTS

2020/0090580 A1 3/2020 Hyeon et al.
2020/0302876 A1* 9/2020 Shin .................... G09G 3/3266

FOREIGN PATENT DOCUMENTS

CN 113077762 A 7/2021
TW 200623013 A 7/2006

OTHER PUBLICATIONS

Taiwan Intellectual Property Office Official action Search report on Oct. 12, 2023.

* cited by examiner

*Primary Examiner* — Andrew Sasinowski
(74) *Attorney, Agent, or Firm* — WPAT, P.C.

(57) ABSTRACT

The present application provides a driver for a display panel, the driver comprises at least one driving circuit, generating a plurality of Type-1 driving signals and a plurality of Type-2 driving signals for driving a plurality of pixels on display panel. The pixels include a plurality of first pixels and a plurality of second pixels adjacent to the first pixels. Each pixel includes a first display element, a second display element, a third display element. The Type-1 driving signals drive the first, second, and third display elements of the first pixels. The Type-2 driving signals drive the first, second, and third display elements of the second pixels. A first pulse of the Type-1 driving signals and a second pulse of the Type-2 driving signals are located at different time segments. By adopting the driver according to the present application, current concentration may be avoided and displaying quality may be improved.

10 Claims, 13 Drawing Sheets

DRIVER FOR DISPLAY PANEL

FIELD OF THE INVENTION

The present application relates to a driver, in particular to a driver for a display panel.

BACKGROUND OF THE INVENTION

Display devices have become the indispensable part of the electronic products for displaying information. They have evolved from liquid crystal displays to mini LED displays and micro LED displays. By using LEDs as display elements, the displaying quality of the display devices may be enhanced. The method for driving the LEDs described above according to the prior art will cause current concentration and induce more electromagnetic interference (EMI), which will affect the displaying quality.

Accordingly, the present application provides a driver for a display panel. By adopting the driver according to the present application, the current concentration may be solved, EMI may be reduced, and the displaying quality may be improved.

SUMMARY OF THE INVENTION

An objective of the present application is to provide a driver for a display panel, which adopts different types of driving signals to drive the display elements of a plurality of pixels on the display panel for avoiding concentration of currents. Thereby, EMI may be reduced and the displaying quality may be improved.

The present application provides a driver for a display panel, which comprises at least one driving circuit, generating a plurality of Type-1 driving signals and a plurality of Type-2 driving signals for driving a plurality of pixels on the display panel. The pixels include a plurality of first pixels and a plurality of second pixels adjacent to the first pixels. Each pixel includes a first display element, a second display element, and a third display element. The Type-1 driving signals drive the first, the second, and the third display elements of the first pixels. The Type-2 driving signals drive the first, the second, and the third display elements of the second pixels. A first pulse of the Type-1 driving signals and a second pulse of the Type-2 driving signals are located at different time segments.

DETAILED DESCRIPTION OF THE INVENTION

In order to make the structure and characteristics as well as the effectiveness of the present application to be further understood and recognized, the detailed description of the present application is provided as follows along with embodiments and accompanying figures.

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising/including" is an open language and should be explained as "comprising but not limited to". Besides, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

Figure 1:
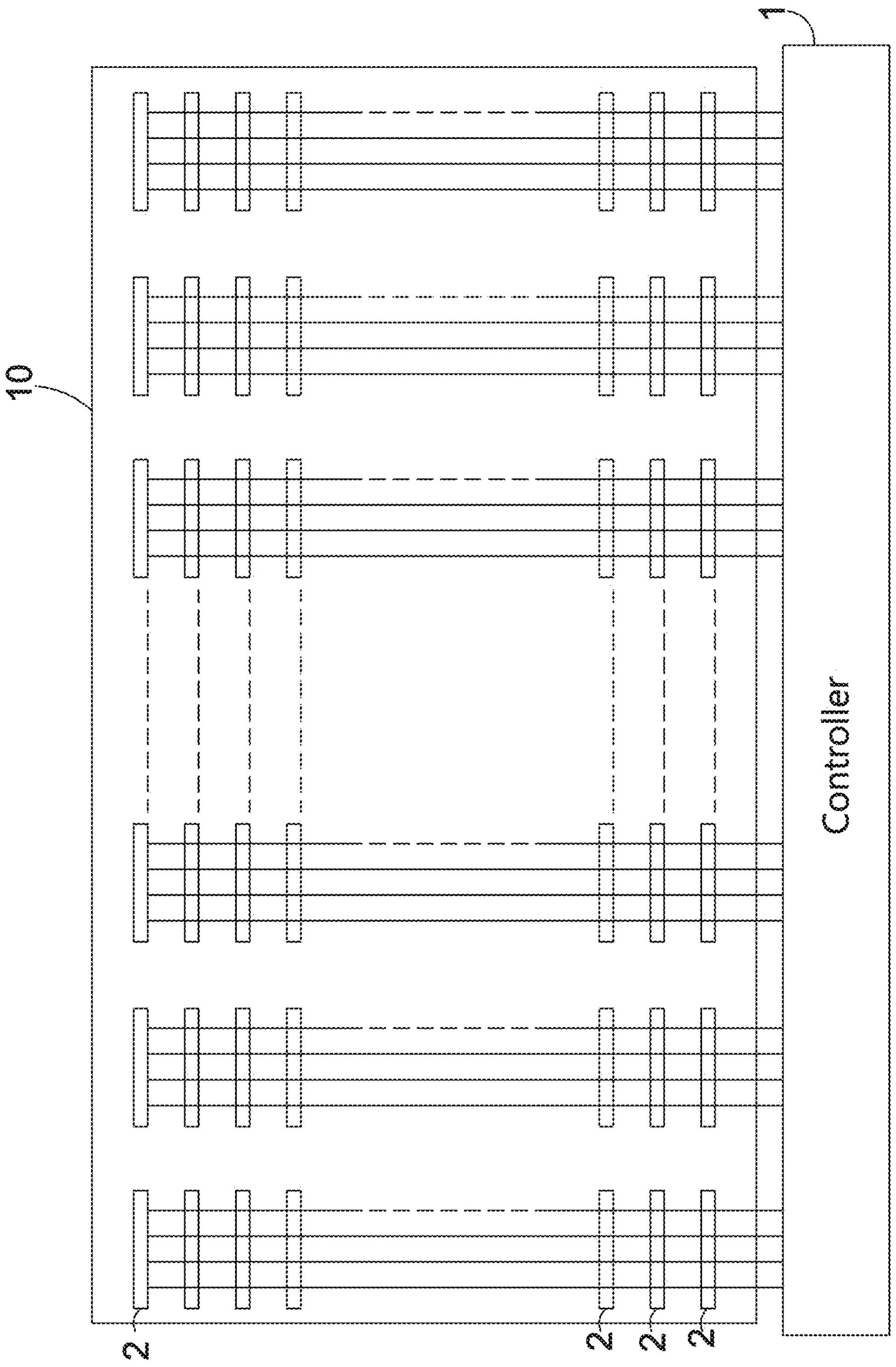
FIG. 1 shows a schematic diagram of the driving architecture according to an embodiment of the present application.
Figure 2:
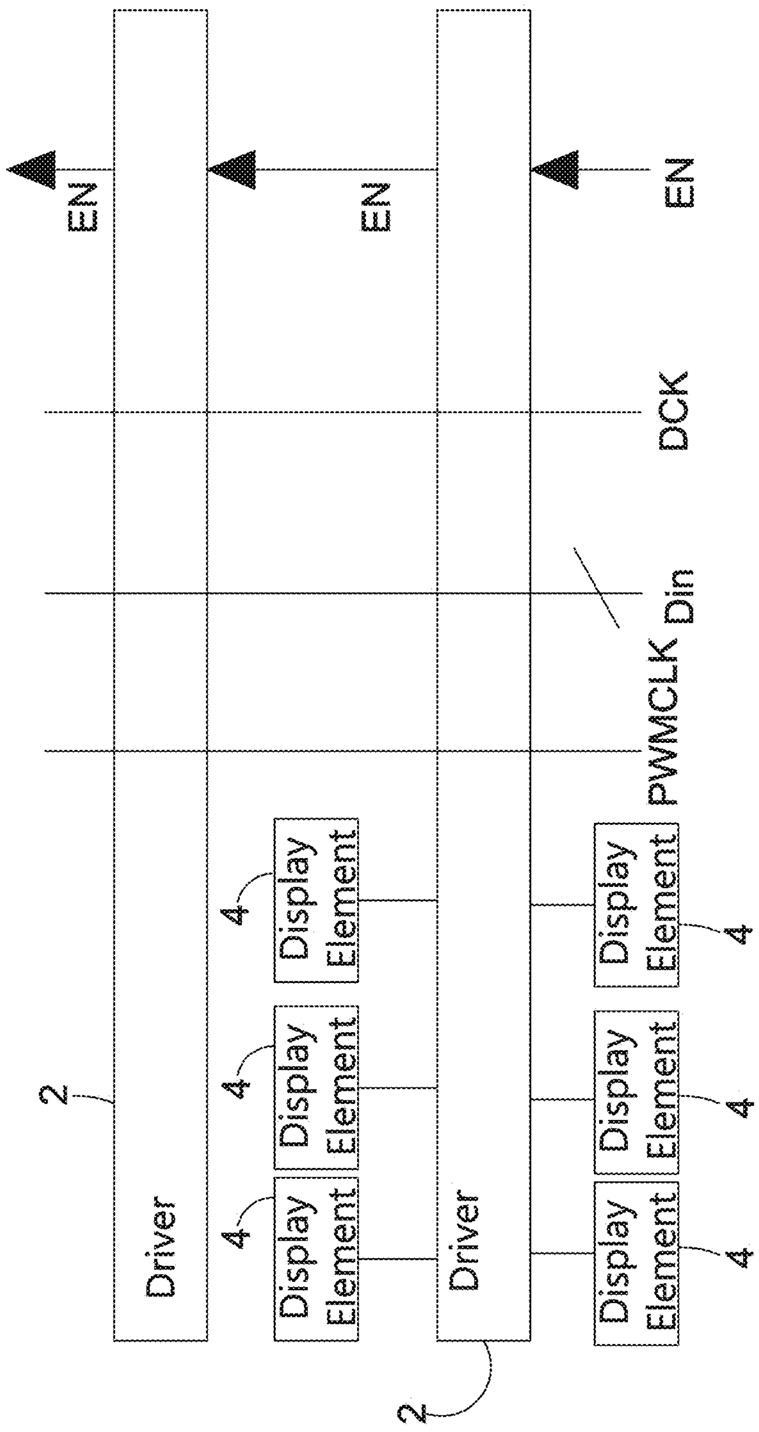
FIG. 2 shows a block diagram of the drivers and the display elements according to an embodiment of the present application.
Figure 4:
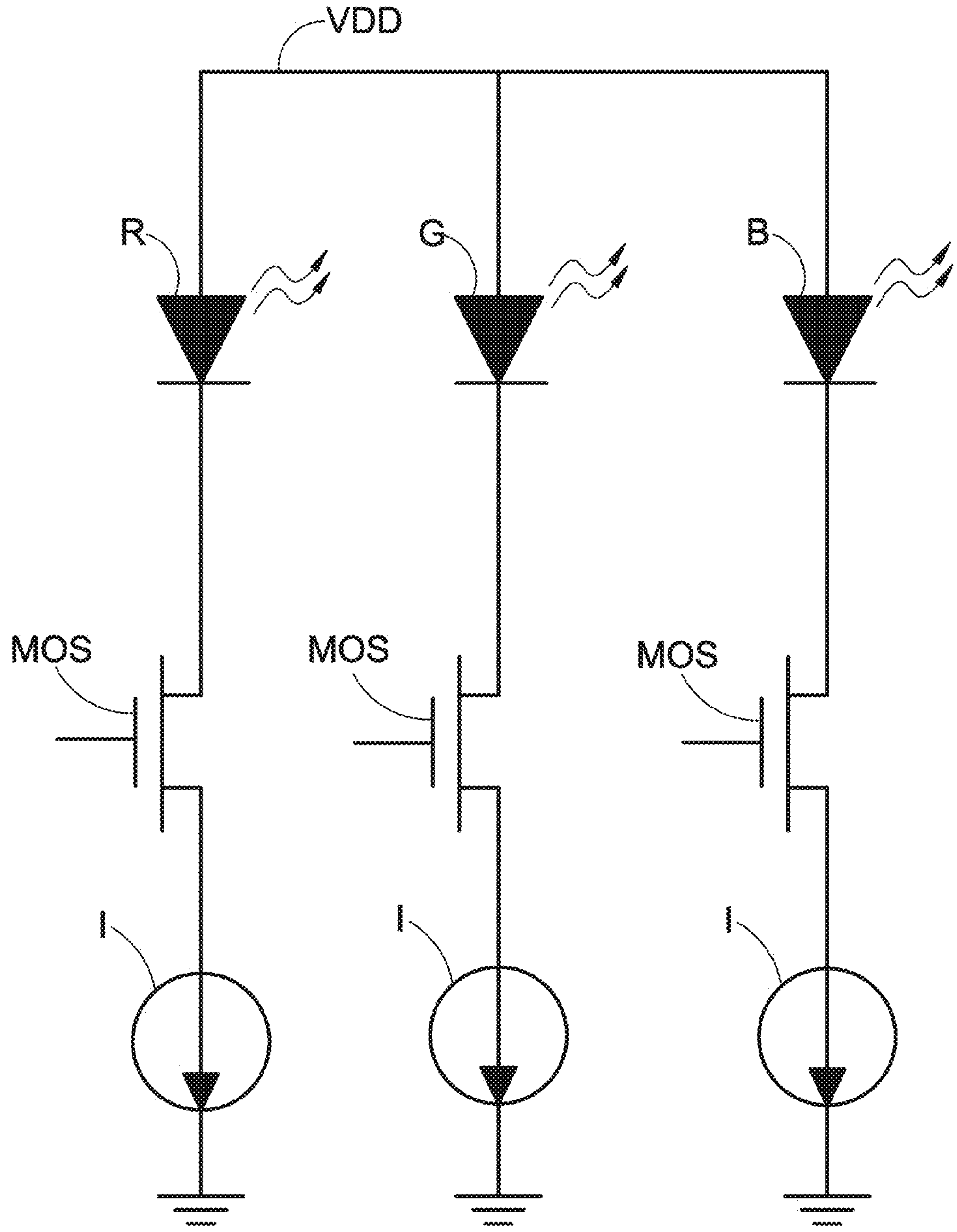
FIG. 4 shows a schematic diagram of the display elements according to an embodiment of the present application.

Please refer to FIG. 1 and FIG. 2. FIG. 1 shows a schematic diagram of the driving architecture according to an embodiment of the present application; FIG. 2 shows a block diagram of the drivers and the display elements according to an embodiment of the present application. As shown in the figures, the driving architecture comprises a controller 1 and a plurality of drivers 2 for driving a plurality of pixels of a display panel 10 to display images. The drivers 2 are arranged in a plurality of rows. Each driver 2 is coupled to a plurality of display elements 4 for driving the display elements 4 to emit light. According to an embodiment of the present application, the display elements 4 may be mini LEDs or micro LEDs. According to an embodiment of the present application, each pixel contains three display elements 4, including a red display element R, a green display element G, and a blue display element B, as shown in FIG. 4. The controller 1 is coupled to the drivers 2 and transmits input data Din, a timing signal DCK, a clock signal PWMCLK, and an enable signal EN to the drivers 2. According to an embodiment of the present application, the controller 1 may be an independent chip. Since the drivers 2 are arranged in a plurality of rows, it may control the pixels arranged in a matrix on the display panel 10.

Figure 3:
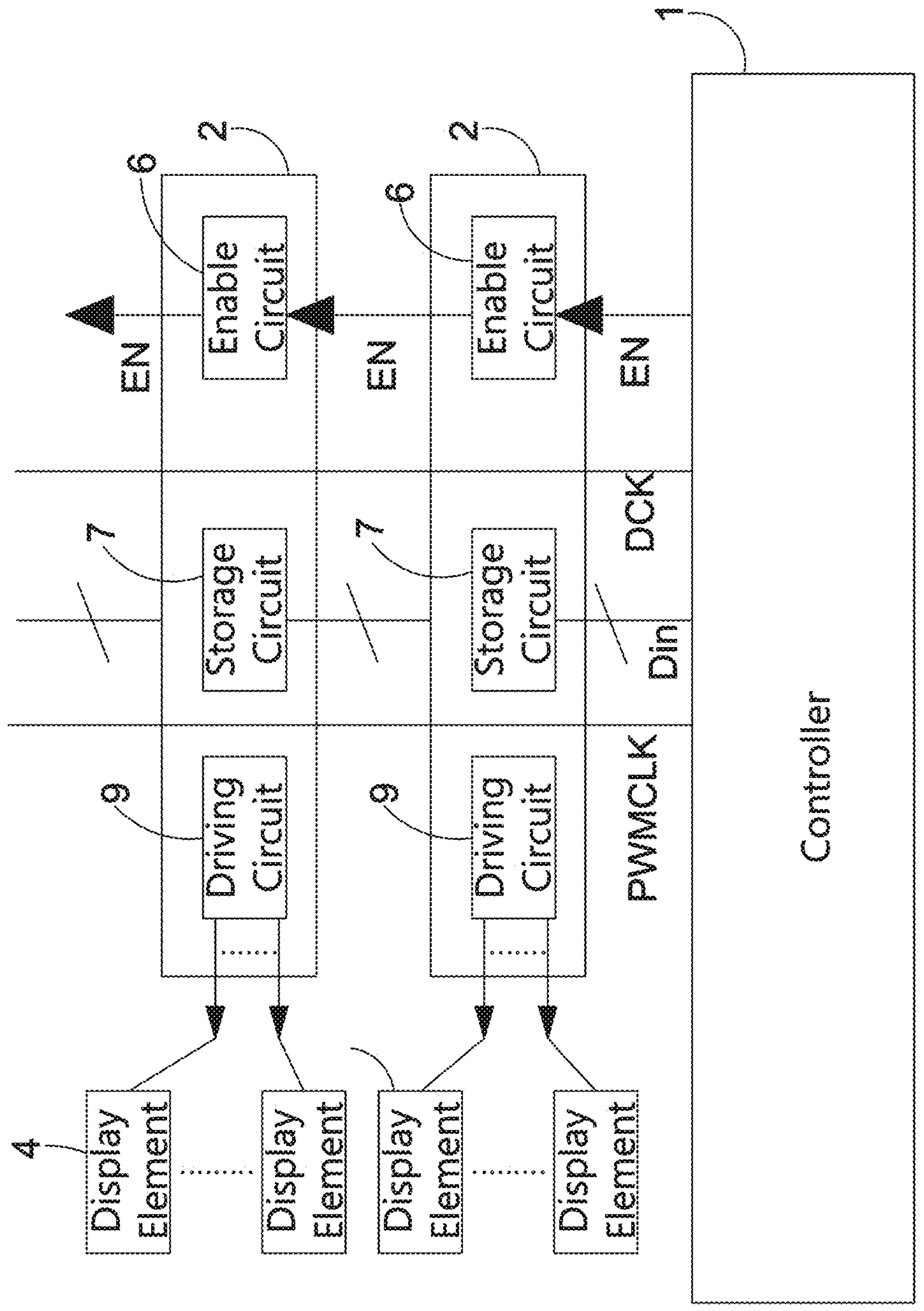
FIG. 3 shows a block diagram of the controller and the drivers according to an embodiment of the present application.

Please refer to FIG. 3, which shows a block diagram of the controller and the drivers according to an embodiment of the present application. As shown in the figure, each driver 2 includes an enable circuit 6, a storage circuit 7, and a driving circuit 9. The enable circuit 6 receives the enable signal EN and enables the storage circuit 7 according to the enable signal EN to receive the input data Din according to the timing signal DCK. The driving circuit 9 is coupled to the storage circuit 7 and the display elements 4, and generates a plurality of driving signals according to the input data Din received by the storage circuit 7 and the clock signal PWMCLK for driving the display elements 4 to generate light for displaying images. After the first driver 2 drives the display elements 4, the enable circuit 6 of the first driver 2 will disable the storage circuit 7 of the first driver 2 and transmit the enable signal EN to the enable circuit 6 of the second driver 2. By using the same operation, the second driver 2 drives the display elements 4 couple thereto, and so on.

Please refer to FIG. 4, which shows a schematic diagram of the display elements according to an embodiment of the present application. As shown in the figure, the display element may be the red display element R, the green display element G, or the blue display element B. One terminal of the red display element R, the green display element G, or the blue display element B is coupled to a supply voltage VDD. A switch MOS is coupled between the other terminal of the display elements R, G, B and a current sink I. The driving signals generated by the driving circuit 9 are used for controlling the switch MOS to drive currents to flow through the display elements R, G, B and emit light.

Figure 5:
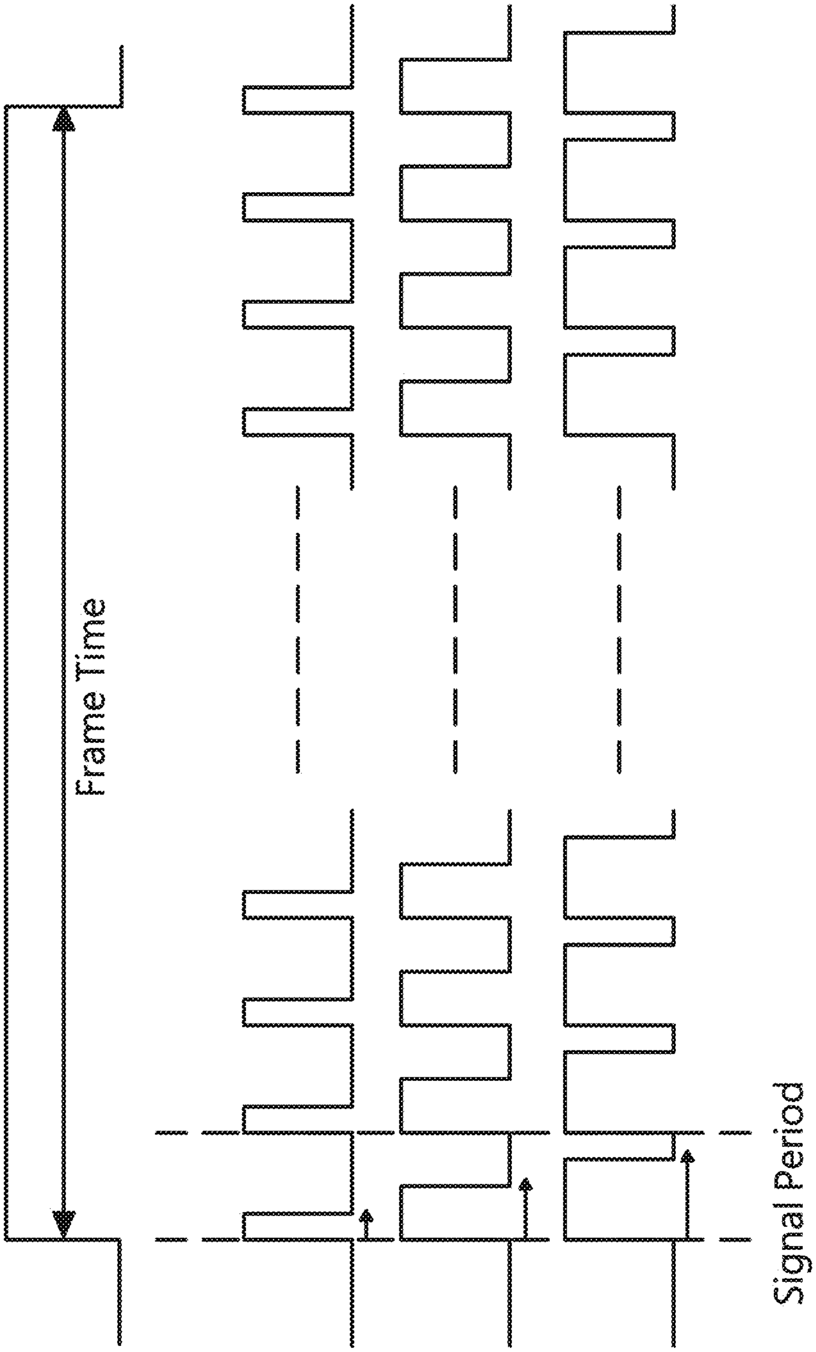
FIG. 5 shows a schematic diagram of the Type-1 driving signal according to an embodiment of the present application.

Please refer to FIG. 5, which shows a schematic diagram of the Type-1 driving signal according to an embodiment of the present application. As shown in the figure, the driving circuit 9 generates a plurality of Type-1 driving signals, which include a plurality of first pulses located at the fore end segment of a signal period. The driving circuit 9 determines the width of the first pulses according to the data Din. If the first pulse is wider, it means that the active time of driving the display elements 4 is longer, leading to greater brightness. In FIG. 5, three first pulses with different widths are shown. According to the present embodiment, the white color is used to represent a plurality of first pixels driven by the Type-1 driving signals.

Figure 6:
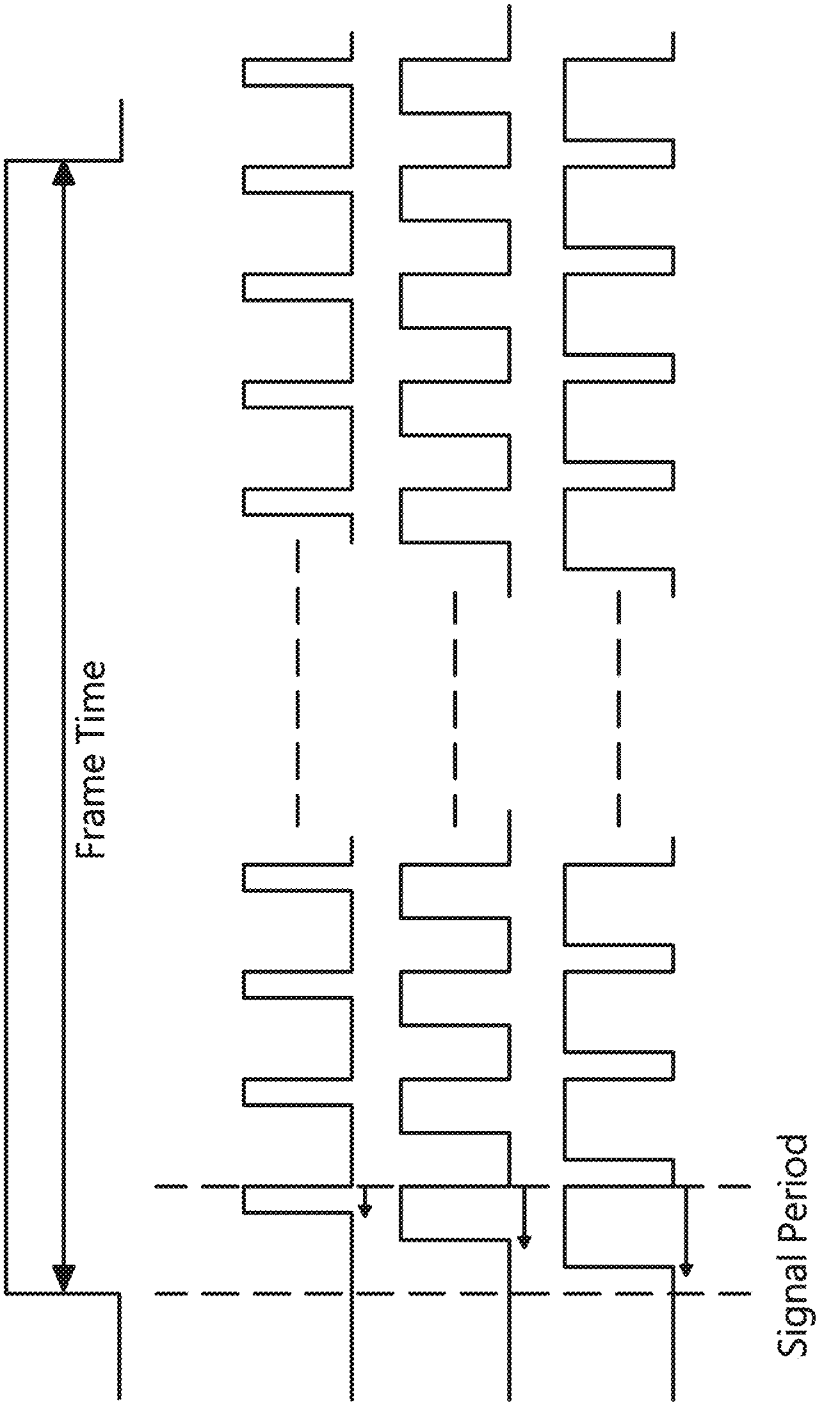
FIG. 6 shows a schematic diagram of the Type-2 driving signal according to an embodiment of the present application.

Please refer to FIG. 6, which shows a schematic diagram of the Type-2 driving signal according to an embodiment of the present application. As shown in the figure, the driving circuit 9 generates a plurality of Type-2 driving signals, which include a plurality of second pulses located at the rear end segment of the signal period. The driving circuit 9 determines the width of the second pulses according to the data Din. If the second pulse is wider, it means that the active time of driving the display elements 4 is longer, leading to greater brightness. According to the above description, in the signal period, the second pulse and the first pulse are located at different time segments. Besides, the starting time of the second pulse is different from the starting time of the first pulse. In FIG. 6, three second pulses with different widths are shown. According to the present embodiment, the gray color is used to represent a plurality of second pixels driven by the Type-2 driving signals. According to an embodiment of the present application, the second pulses of the Type-2 driving signals may be located at the middle segment of the signal period, as shown in FIG. 7.

Figure 7:
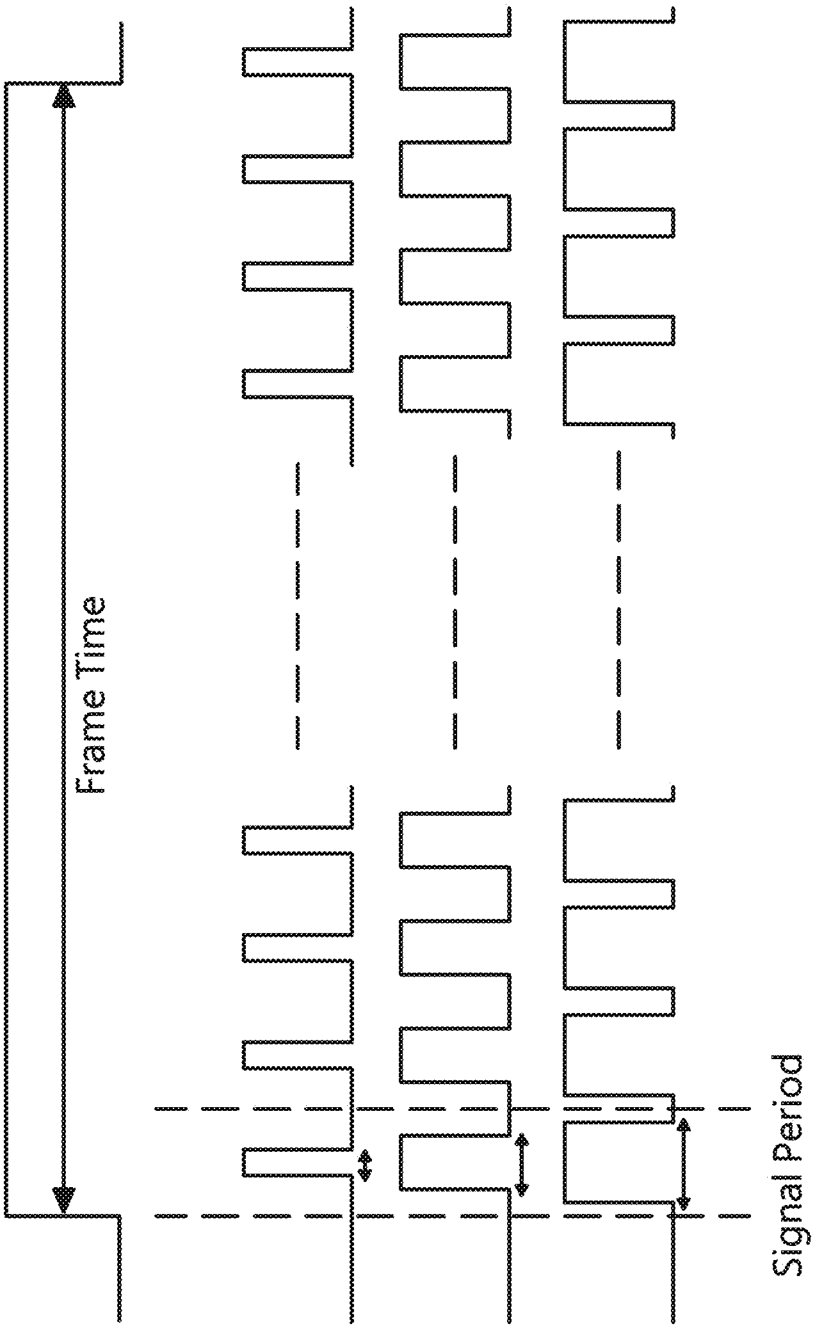
FIG. 7 shows a schematic diagram of the Type-3 driving signal according to an embodiment of the present application.

Please refer to FIG. 7, which shows a schematic diagram of the Type-3 driving signal according to an embodiment of the present application. As shown in the figure, the driving circuit 9 generates a plurality of Type-3 driving signals, which include a plurality of third pulses located at the middle segment of the signal period. The middle segment is located after the fore end segment and before the rear end segment. The driving circuit 9 determines the width of the third pulses according to the data Din. If the third pulse is wider, it means that the active time of driving the display elements 4 is longer, leading to greater brightness. In FIG. 7, three third pulses with different widths are shown. According to the present embodiment, the stripe pattern is used to represent a plurality of third pixels driven by the Type-3 driving signals.

The present application applies the Type-1, Type-2, and Type-3 driving signals to drive pixels for avoiding concentration of currents. Thereby, EMI may be reduced and the displaying quality may be improved.

Figure 8:
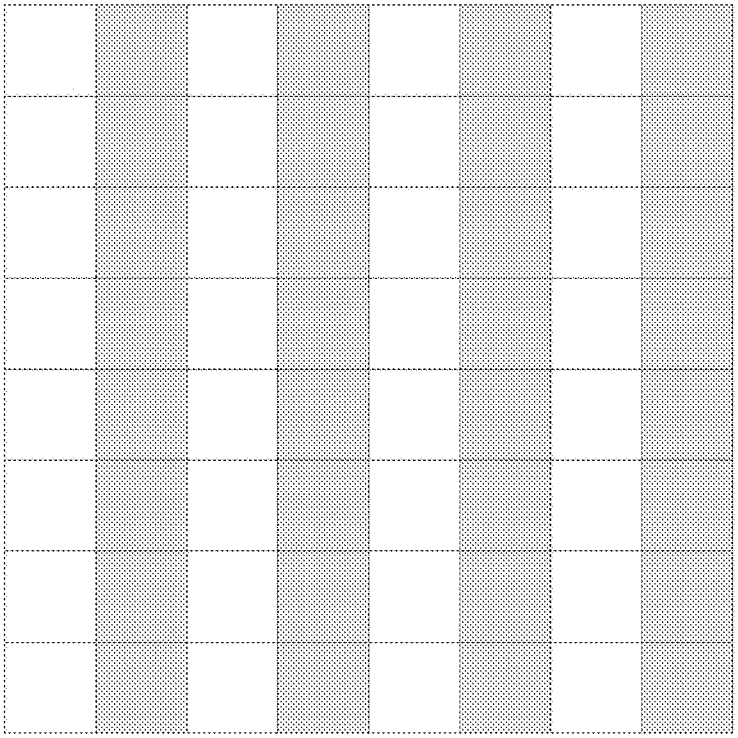
FIG. 8 to FIG. 18 show schematic diagrams of driving the pixels according to embodiments of the present application.

Please refer to FIG. 8, in which the driving circuit 9 generates the Type-1 driving signals for driving a plurality of first pixels located on odd columns. The Type-1 driving signals drive the three display elements 4 of each first pixel. In addition, the driving circuit 9 generates the Type-2 driving signals for driving a plurality of second pixels located on even columns. The Type-2 driving signals drive the three display elements 4 of each second pixel. According to the present embodiment, the first pixels and the second pixels are adjacent to one another. According to an embodiment of the present application, the Type-1 driving signals may be used to drive the pixels located on adjacent columns, for example, the pixels located on the first and the second columns. The Type-2 driving signals may be used to drive the pixels located on the third and the fourth columns.

Figure 9:
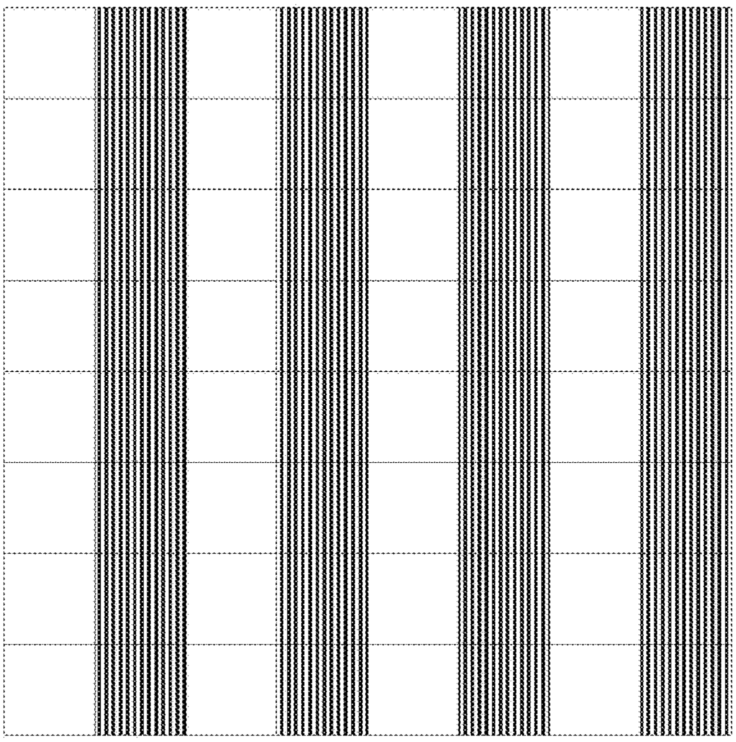

Please refer to FIG. 9, in which the driving circuit 9 generates the Type-1 driving signals for driving pixels located on odd columns. In addition, the driving circuit 9 generates the Type-3 driving signals for driving pixels located on even columns. The Type-3 driving signals drive the three display elements 4 of each pixel. According to an embodiment of the present application, the Type-1 driving signals may be used to drive the pixels located on adjacent columns, for example, the pixels located on the first and the second columns. The Type-3 driving signals may be used to drive the pixels located on the third and the fourth columns.

Figure 10:
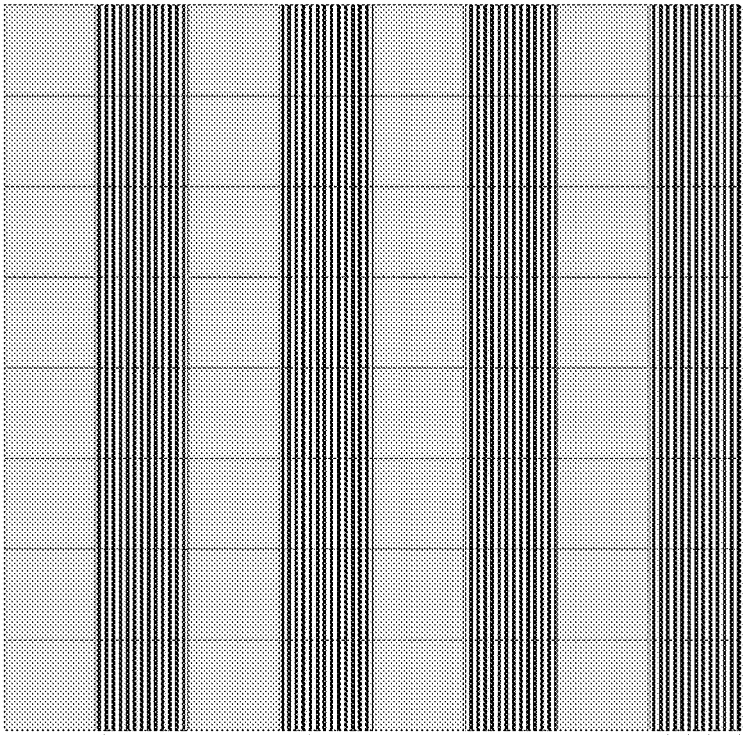

Please refer to FIG. 10, in which the driving circuit 9 generates the Type-2 driving signals for driving pixels located on odd columns. In addition, the driving circuit 9 generates the Type-3 driving signals for driving pixels located on even columns. According to an embodiment of the present application, the Type-2 driving signals may be used to drive the pixels located on adjacent columns, for example, the pixels located on the first and the second columns. The Type-3 driving signals may be used to drive the pixels located on the third and the fourth columns.

Figure 11:
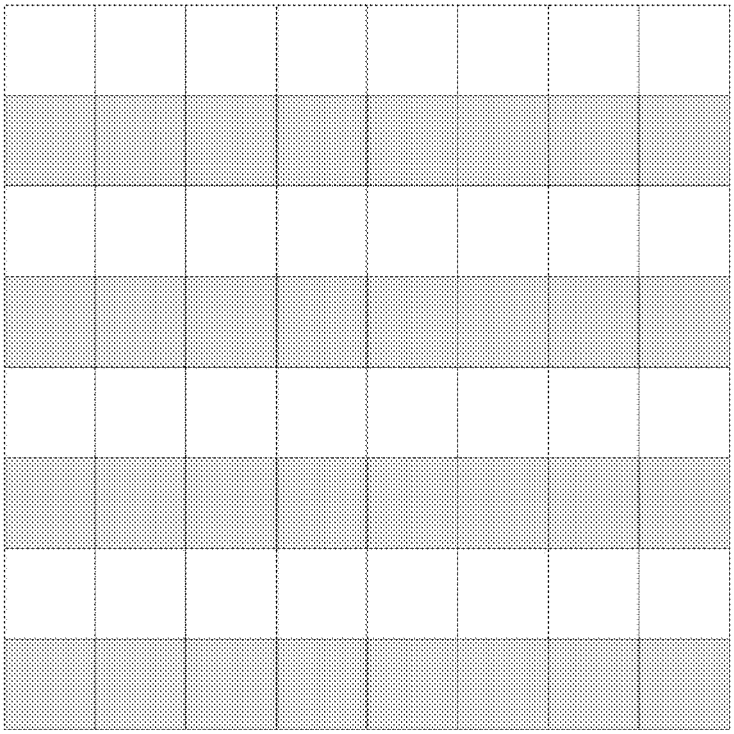

Please refer to FIG. 11, in which the driving circuit 9 generates the Type-1 driving signals for driving pixels located on odd rows. In addition, the driving circuit 9 generates the Type-2 driving signals for driving pixels located on even rows. According to an embodiment of the present application, the Type-1 driving signals may be used to drive the pixels located on adjacent rows, for example, the pixels located on the first and the second rows. The Type-2 driving signals may be used to drive the pixels located on the third and the fourth rows.

Please refer to FIG. 11, in which the driving circuit 9 generates the Type-1 driving signals for driving pixels located on odd rows. In addition, the driving circuit 9 generates the Type-2 driving signals for driving pixels located on even rows. According to an embodiment of the present application, the Type-1 driving signals may be used to drive the pixels located on adjacent rows, for example, the pixels located on the first and the second rows. The Type-2 driving signals may be used to drive the pixels located on the third and the fourth rows.

Figure 12:
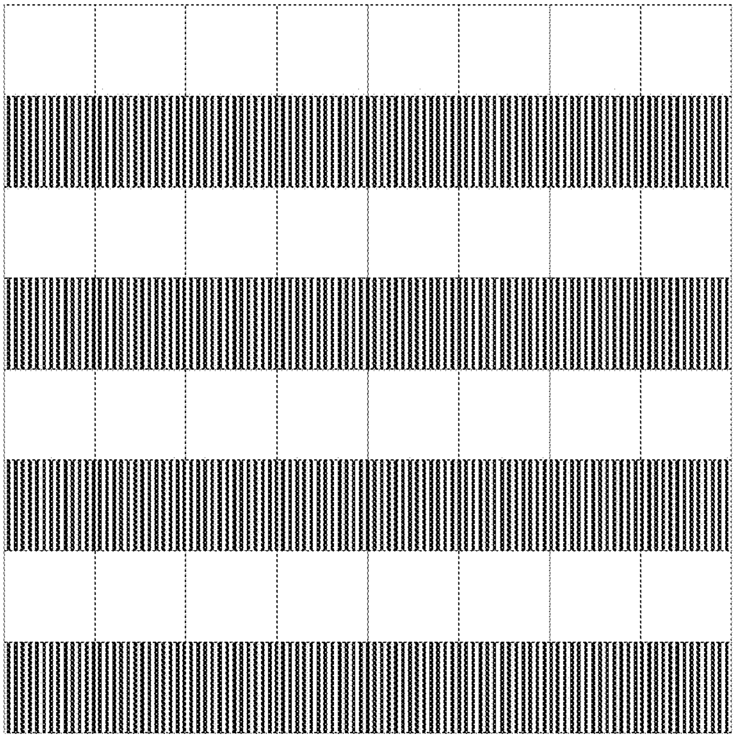
Figure 13:
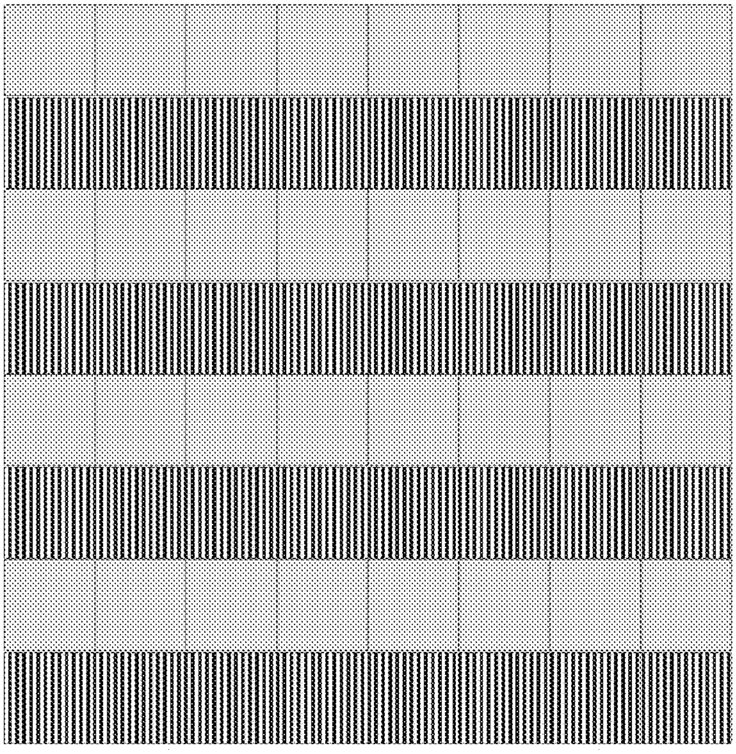
Figure 14:
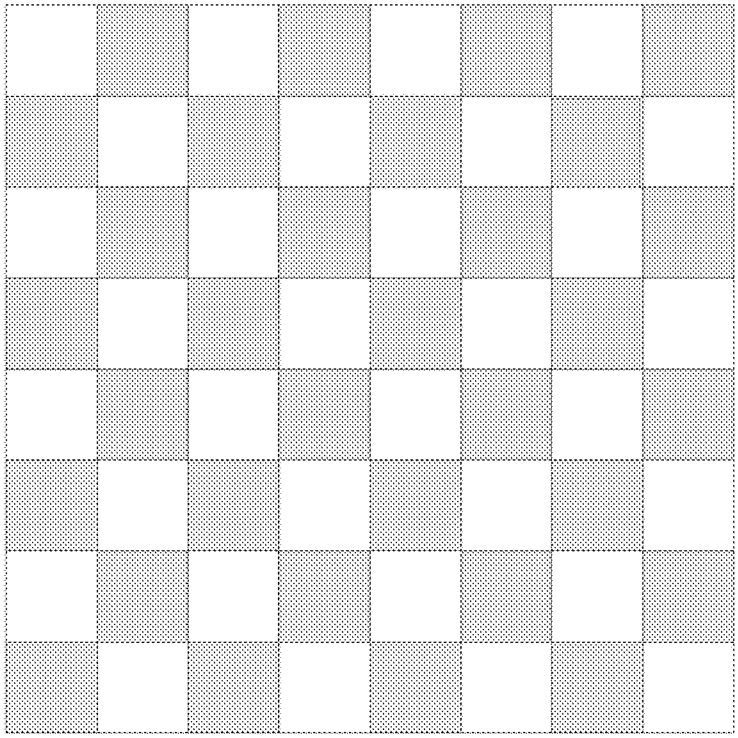
Figure 15:
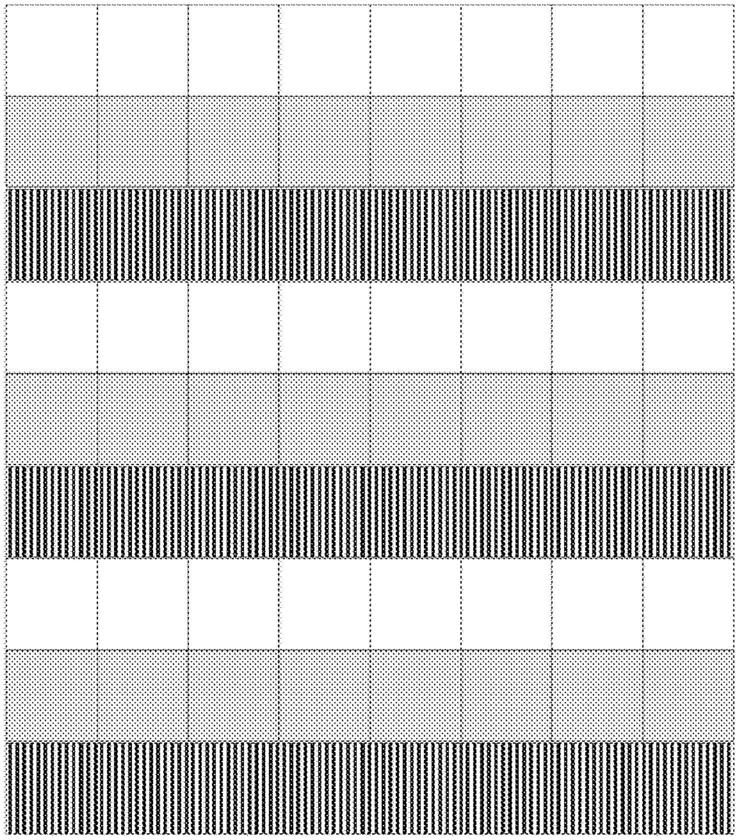
Figure 16:
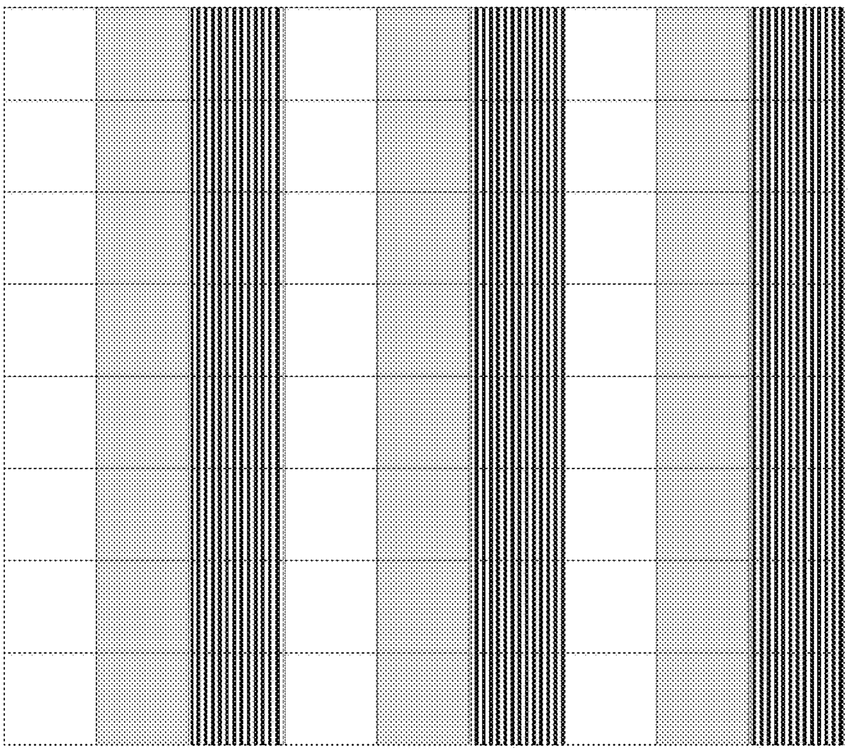
Figure 17:
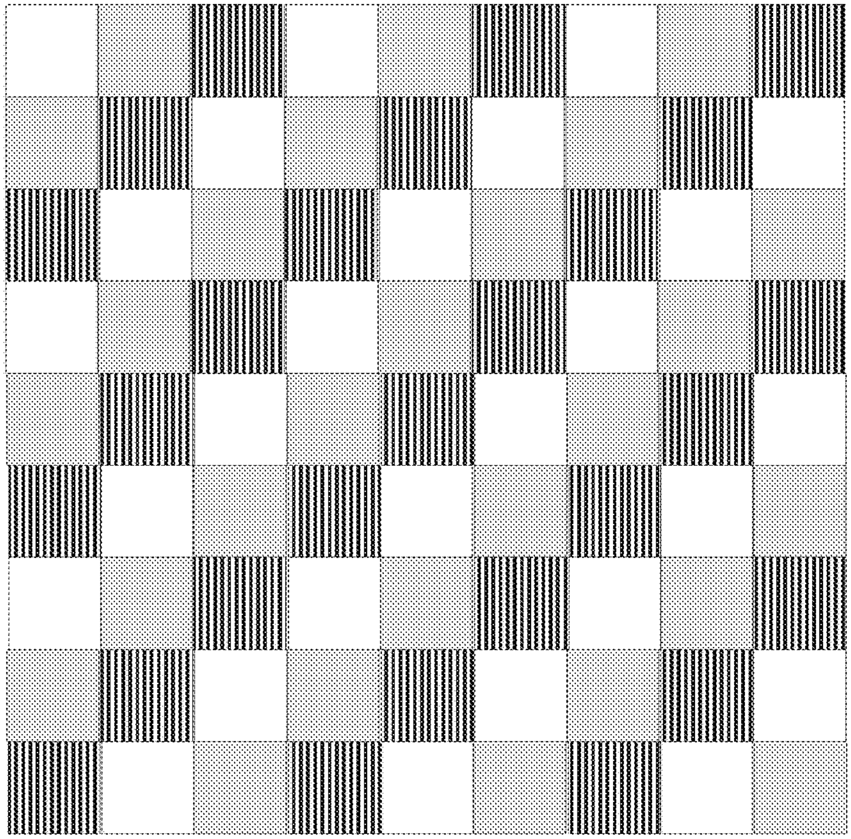
Figure 18:
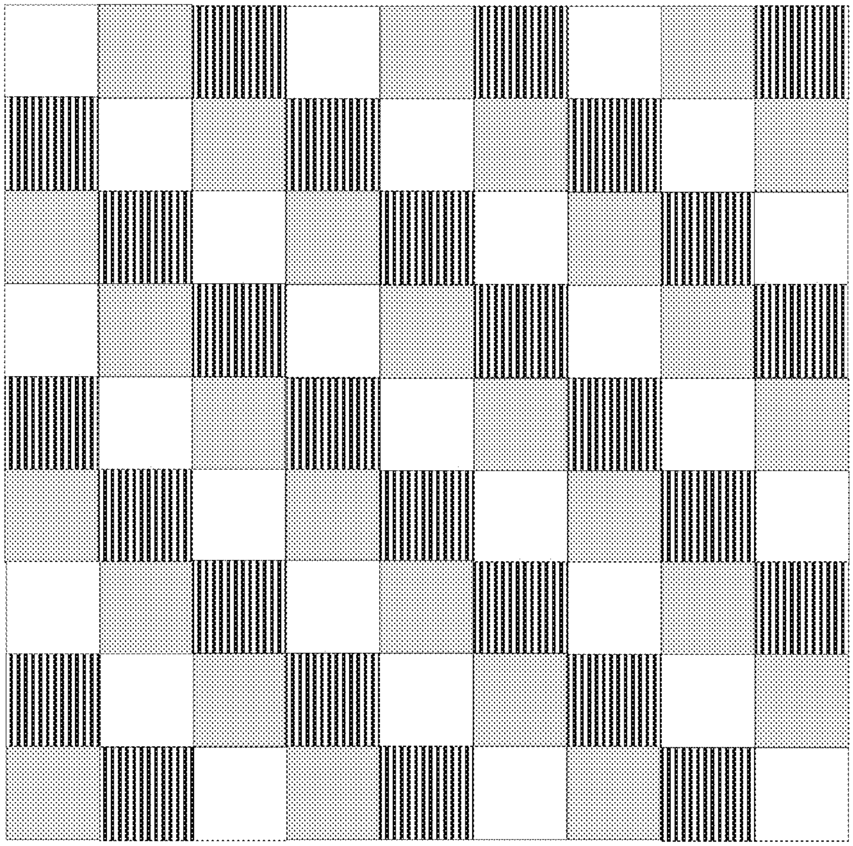

Please refer to FIG. 12, in which the driving circuit 9 generates the Type-1 driving signals for driving pixels located on odd rows. In addition, the driving circuit 9 generates the Type-3 driving signals for driving pixels located on even rows. According to an embodiment of the present application, the Type-1 driving signals may be used to drive the pixels located on adjacent rows, for example, the pixels located on the first and the second rows. The Type-3 driving signals may be used to drive the pixels located on the third and the fourth rows.

Please refer to FIG. 14 to FIG. 18, in which the combinations of the Type-1, Type-2, and Type-3 driving signals are applied to driving the pixels of the display panel.

Accordingly, the present application conforms to the legal requirements owing to its novelty, nonobviousness, and utility. However, the foregoing description is only embodiments of the present application, not used to limit the scope and range of the present application. Those equivalent changes or modifications made according to the shape, structure, feature, or spirit described in the claims of the present application are included in the appended claims of the present application.

The invention claimed is:

1. A driver for a display panel, comprising:

at least one driving circuit, generating a plurality of Type-1 driving signals and a plurality of Type-2 driving signals according to an input data, said Type-1 driving signals and said Type-2 driving signals driving a plurality of pixels of said display panel, said pixels including a plurality of first pixels and a plurality of second pixels adjacent to said first pixels, each said pixel including a first display element, a second display element, a third display element, said Type-1 driving signals driving said first, said second, and said third display elements of said first pixels, said Type-2 driving signals driving said first, said second, and said third display elements of said second pixels, said driving circuit determining a width of a first pulse of said Type-1 driving signals and a width of a second pulse of said Type-2 driving signals according to said input data, and said first pulse of said Type-1 driving signals and said second pulse of said Type-2 driving signals located at different time segments.

2. The driver of claim 1, wherein said Type-1 driving signals and said Type-2 driving signals have a signal period, a starting time located at said signal period of said first pulse of said Type-1 driving signals is different from a starting time located at said signal period of said second pulse of said Type-2 driving signals.

3. The driver of claim 1, wherein said Type-1 driving signals and said Type-2 driving signals have a signal period, said first pulse of said Type-1 driving signals and said second pulse of said Type-2 driving signals are located at different time segments of said signal period.

4. The driver of claim 1, wherein said Type-1 driving signals and said Type-2 driving signals have a signal period, said first pulse of said Type-1 driving signals is located at a fore end segment of said signal period and said second pulse of said Type-2 driving signals is located at a rear end segment of said signal period.

5. The driver of claim 1, wherein said Type-1 driving signals and said Type-2 driving signals have a signal period, said first pulse of said Type-1 driving signals is located at a fore end segment of said signal period; said second pulse of said Type-2 driving signals is located at a middle segment of said signal period; and said middle segment is located after said fore-end segment.

6. The driver of claim 1, wherein said driving circuit further generates a plurality of Type-3 driving signals and determines a width of a third pulse of said Type-3 driving signals according to said input data; said pixels further comprises a plurality of third pixels; said Type-3 driving signals drives said first, said second, and said third display elements of said third pixels; said Type-1 driving signals, said Type-2 driving signals and said Type-3 driving signals have a signal period, and said third pulse of said Type-3 driving signals, said first pulse of said Type-1 driving signals, and said second pulse of said Type-2 driving signals are located at different time segments of said signal period.

7. The driver of claim 6, wherein said first pulse of said Type-1 driving signals is located at a fore end segment of said signal period; said second pulse of said Type-2 driving signals is located at a rear end segment of said signal period; and said third pulse of said Type-3 driving signals is located at a middle segment of said signal period.

8. The driver of claim 1, further comprising:

a storage circuit, coupled to said driving circuit, and storing said input data; and an enable circuit, coupled to said storage circuit, and enabling said storage circuit receiving said input data for storing said input data.

9. A driver for a display panel, comprising:

at least one driving circuit, generating a plurality of Type-1 driving signals and a plurality of Type-2 driving signals according to an input data, determining a width of a first pulse of said Type-1 driving signals and a width of a second pulse of said Type-2 driving signals according to said input data, and said first pulse of said Type-1 driving signals and said second pulse of said Type-2 driving signals located at different time segments.

10. The driver of claim 9, wherein said driving circuit further generates a plurality of Type-3 driving signals and determines a width of a third pulse of said Type-3 driving signals according to said input data, said Type-1 driving signals, said Type-2 driving signals and said Type-3 driving signals have a signal period, and said third pulse of said Type-3 driving signals, said first pulse of said Type-1 driving signals, and said second pulse of said Type-2 driving signals are located at different time segments of said signal period.

* * * * *